E. GATES.
METHOD OF PURIFYING LIQUIDS.
APPLICATION FILED MAR. 6, 1906. RENEWED MAY 28, 1908.
1,045,830.
Patented Dec. 3, 1912.
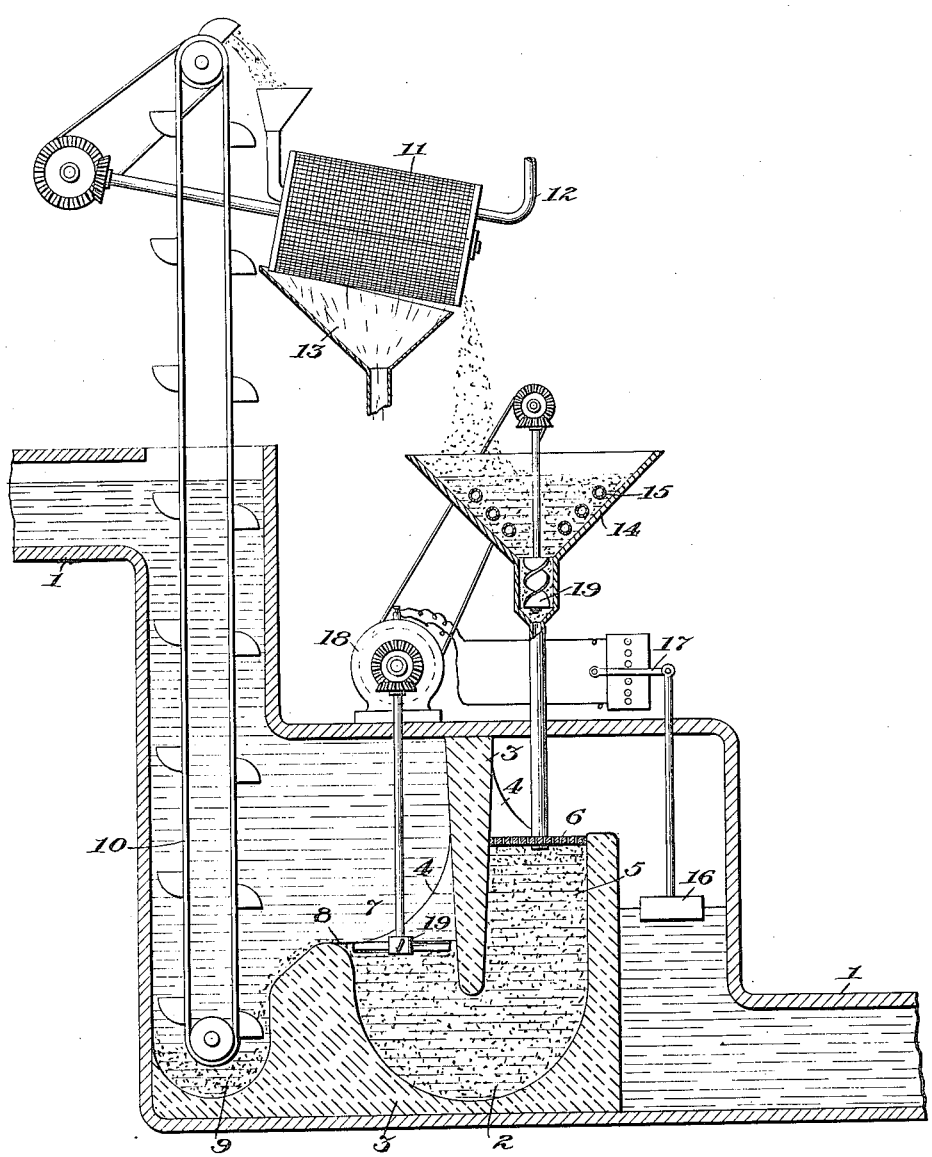

UNITED STATES PATENT OFFICE.

ELMER GATES, OF CHEVY CHASE, MARYLAND, ASSIGNOR TO GERMPROOF RAPID SAND FILTRATION COMPANY, OF NEW YORK, N. Y., A CORPORATION OF NEW YORK.

METHOD OF PURIFYING LIQUIDS.

1,045,830.

Specification of Letters Patent.

Patented Dec. 3, 1912.

Application filed March 6, 1906, Serial No. 304,788. Renewed May 28, 1908. Serial No. 435,445.

*To all whom it may concern:*

Be it known that I, ELMER GATES, a citizen of the United States, residing at Chevy Chase, in the county of Montgomery and State of Maryland, have invented certain new and useful Improvements in Methods of Purifying Liquids, of which the following is a specification.

This invention is a method of purifying liquids, especially water, and in its preferred embodiment provides a method for filtering the same through sand or equivalent divided filtering medium while continuously removing the slime layers which tend to accumulate at and near the surface of entry of the water, together with the surface layer of particles constituting the filter bed. The filter bed is maintained of substantially uniform thickness by supplying sand at a proportionate rate to the opposite or effluent surface: preferably the sand discharged at the surface of entry of the water is sterilized and is automatically transferred to the opposite side or surface of the bed.

All hitherto known methods which are suitable for handling large quantities of water at an expense not commercially prohibited are defective because (1) disease-producing germs, and especially their smaller spores, are not completely removed but are merely diminished in number; (2) the soluble organic poisons ordinarily held in natural lake and river waters are augmented by the filtration processes owing to the fact that the water is caused slowly to percolate through the putrefactive slime-layer that almost immediately collects on the surface, thus dissolving out ptomaines; and (3) the fine sediment is not at all times completely removed so as to properly clarify the water. The best method at present in use for purifying water is by what is called "slow filtration," and it is well known this becomes effective only when a slime layer forms on the surface of the sand. Such layer renders the rate of filtration very slow and correspondingly increases the required surface; and in addition to dissolving the soluble organic poisons due to the putrefaction of the germs it gives a longer period of time for the living germs to multiply. After a few days this slime-layer becomes the breeding place for pathologic germs and supplies them from its under surface to the filtered water. At regular intervals the surface of a filter bed of this character must be cleaned by dredging or scraping which constitutes a large part of the cost of maintenance. If in a bed of this kind sand were used presenting interstices fine enough to screen out the spores without the use of a slime layer the filter would immediately become clogged and inoperative.

If water under some pressure be admitted to a Pasteur tube it will traverse it freely for a second or two, but within a period of a few seconds if germs or fine sediment be present in the water the rate of filtration will drop to one-tenth or even lower, and in a short time the rate of filtration may fall to one-four-hundredths of the original rate. The same is true if instead of a Pasteur tube very fine sand is used, that is sand consisting of grains so small that the interstices are of approximately the same porosity as those of the Pasteur tube. Mechanical devices for brushing away this slime and sediment layer do not unclog the pores beneath the surface and are therefore ineffective.

According to the preferred utilization of my method the clogging and poisonous effect of the slime layers are effectively obviated by their continuous and automatic removal, by a constant renewal of the filtering surface, and by a constant renewal of the filter bed itself. I accomplish this preferably by imparting to the filter bed itself a movement in a direction opposite to that of the liquid traversing it, discharging the sand at the surface of entry for liquid and supplying clean sand at substantially the same rate to the opposite surface of the bed.

The rate of removal and supply of the sand, as well as the details of the method, will depend upon the fineness of the sand used. The sand may be so fine that the interstices between the grains are small enough to actually prevent entry of germs and spores. In such case the discharge of the surface layer and its renewal from the clean adjoining layers should be sufficiently rapid to maintain the surface of entry substantially clear of accumulated germs, spores or matter comprised in the term "slimes," so that the rate of filtration is not markedly diminished. In this case the germs and spores do not penetrate the body of the filtering bed although free passage is afforded to the water.

An alternative method of procedure is to employ a relatively coarse sand, affording interstices of sufficient size to admit the germs and spores and offering therefore a relatively free passage for the water. I have discovered that although the germs and spores may in time traverse a stationary bed of this character, yet their rate of progress therethrough is relatively very slow as compared with that of the water, their progress being greatly retarded by the obstruction afforded by the grains. The absolute rate of movement of germs and spores through the bed will depend upon the character of the germs or spores, the size of the interstices in the bed, and the pressure and temperature of the water. I have, however, repeatedly confirmed the observation that in the case of a layer of sand eighteen inches in thickness and presenting interstices sufficient for a very free flow of water no germs will appear at the effluent surface in less than two hours, and no spores in less than one-half hour. To prevent the appearance of germs therefore at the effluent side of the bed it is necessary merely to renew the sand or other material constituting the bed at a rate in excess of that at which the germs progress therethrough; and to prevent the appearance of both germs and spores it is only necessary to renew the bed at such greater rate as shall exceed the rate of movement of the spores.

It is often desirable to provide two beds to be traversed successively by the water, the first serving to remove the germs as above described and the second to remove the spores. For this purpose the second bed may be of fine sand or it may be of relatively coarse sand renewed at such rate as will prevent the passage of the spores.

The sand discharged at the surface of the entry of water is preferably in every case washed, sterilized as, for instance, by boiling water, and returned to the effluent side of the filter bed, this operation being readily and automatically performed by any suitable means. It is desirable that the grains constituting a filter bed should be of substantially uniform size in order that the required rate of movement may be substantially uniform.

It is obvious that in case of neither of the methods above described is the water percolated through the slimes deposited therefrom, and that therefore there can be no increase in the proportion of soluble organic poisons in solution.

The method may be carried into effect in various ways.

The accompanying drawing shows in vertical section one means for carrying out the invention.

In practice I propose to provide a substantially U-shaped passage 2 within the aqueduct 1 by placing transversely across the same a suitably formed barrier 3 which will preferably be of concrete or cement, this U-shaped passage constituting the only path for the water between opposite sides of the barrier. In case of concrete or cement construction the barrier will be reinforced by webs 4 at frequent intervals. This passage is filled with sand 5 which is constantly supplied at the effluent and preferably higher side 6, the entry and preferably lower side 7 serving as the surface of discharge for the sand. The passage may be outwardly flared at the entry end as indicated at 8, to provide a surface of entry for the liquid which is larger than the sectional area of the body of the filter bed. The sand falls as discharged into a transverse trough 9 from which it is mechanically conveyed as by an ordinary bucket conveyer 10 to the washing and sterilizing apparatus and thereafter returned to the effluent side of the bed as above described. For washing, the sand may be discharged into a suitable revolving screen 11 and subjected therein to a spray of water from a pipe 12, the water being conveniently collected in a hopper 13 and the sand discharged into a hopper 14 communicating with the effluent side 6 of the U-shaped passage 2. The sterilization may be effected by heating coils 15 illustrated as placed in the hopper 14. I may also provide an automatic device, actuated by the level of the water on the effluent side, for governing the rate at which the bed is renewed, in such manner that the rate of renewal will be automatically increased should the volume of water in the effluent side be diminished. As shown, this device comprises a float 16 actuating a lever 17 controlling an electric motor 18 which drives the feeding mechanism 19, here shown as a screw of ordinary form. It is obvious that the rise or fall of the float will govern the speed of the motor and hence the rate at which the filter bed is renewed, as above described. I may also provide in connection with either the finer or coarser sand a mechanical scraper 20 for cleaning the surface of entry by the removal of the surface layer.

I claim:—

1. The method of purifying liquids by filtration which consists in percolating the liquid through a filtering medium, and simultaneously moving the medium in a direction other than that of the liquid flow, substantially as described.

2. The method of purifying liquids by filtration which consists in percolating the liquid through a filter bed, and simultaneously moving the particles constituting the bed in a direction opposite to that of the liquid flow, the rate of movement of the particles being such that the germs carried by the liquid are prevented from traversing the bed, substantially as described.

3. The method of purifying liquids by filtration which consists in percolating the liquid through a filtering medium, and simultaneously moving the medium in a direction other than that of the liquid flow, the rate of movement of the medium being such that physical impurities carried by the liquid are prevented from traversing the medium, substantially as described.

4. The method of purifying liquids by filtration which consists in percolating the liquid through a filter bed, simultaneously moving the particles constituting the bed in a direction opposite to that of the liquid flow, discharging said particles at the surface of entry for liquid, sterilizing them, and returning them to the opposite surface of the bed, substantially as described.

5. The method of purifying liquids by filtration which consists in percolating the liquid through a filter bed consisting of particles and constantly renewing said particles at the surface of entry for liquid, substantially as described.

6. The method of purifying liquid by filtration which consists in filtering a fluid through a bed of suitable material, and removing, cleansing and returning said material without interrupting the filtering operation, substantially as described.

7. The method of purifying liquid by filtration which consists in percolating the liquid through a filter bed consisting of particles, constantly renewing said particles at the surface of the entry for liquid by moving said bed in a direction opposite to that of the liquid flow, sterilizing them and returning them to the opposite surface of the bed, substantially as described.

8. The method of purifying liquids by upward filtration through a layer of sand or other particles which consists in feeding sand to the upper end or surface of a filter bed in a U-shaped channel and in removing from the upturned and preferably shorter leg of the channel the layer of surface particles with the accumulating slime and sediment, substantially as described.

9. The method of purifying liquids by filtration through a layer of solid particles, which consists in removing, fast enough to maintain rapid filtration, the layer of particles with its accumulated slime and sediment from that surface of the filter bed into which the impure water enters and in feeding clean sand to the other side of the filter bed at the same rate so as to maintain a layer of approximately uniform thickness, substantially as described.

10. The method of filtration which consists in causing a liquid to enter the shorter and upturned leg of a U-shaped channel and flow upwardly through the longer leg, and simultaneously causing filtering particles to move downwardly through the longer leg and overflow from the upturned end of the shorter leg at the surface of entry for the liquid, substantially as described.

11. The method of purifying liquids by filtration which consists in passing the liquid through a filtering medium, and moving the medium in a direction other than that of the liquid flow, substantially as described.

12. The method of purifying liquids by filtration which consists in percolating the liquid through a filter bed, and moving the particles constituting the bed in a direction other than that of the liquid flow, the rate of movement of the particles being such that impurities carried by the liquid are prevented from traversing the bed, substantially as described.

13. The method of purifying liquids by filtration which consists in percolating the liquid through a filter bed, and moving the particles constituting the bed in a direction other than that of the liquid flow, the rate of movement of the particles being such that physical impurities carried by the liquid are prevented from traversing the bed, substantially as described.

14. The method of purifying liquids by filtration which consists in percolating the liquid through a filter bed, moving the particles constituting the bed in a direction other than that of the liquid flow, discharging said particles at the surface of entry for liquid, cleaning them, and returning them to the opposite surface of the bed, substantially as described.

15. The method of purifying liquids by filtration which consists in percolating the liquid through a filter bed, moving the particles constituting the bed in a direction other than that of the liquid flow, the rate of movement of the particles being such that germs and spores carried by the liquid are prevented from traversing said bed, discharging the particles at the surface of entry for liquid, sterilizing them, and returning them to the oposite surface of the bed, substantially as described.

16. The method of purifying liquids by filtration which consists in percolating the liquid through a filter bed consisting of movable particles and removing said particles at the surface of entry for liquid and returning them at the other side of the filter bed, substantially as described.

17. The method of purifying liquid by filtration which consists in percolating the liquid through a filter bed consisting of particles, and renewing said particles at the surface of entry for liquid by moving said bed in a direction opposite to that of the liquid flow, substantially as described.

18. The method of purifying liquid by filtration which consists in percolating the liquid through a filter bed consisting of particles, renewing said particles at the surface of entry for liquid by moving said bed in a direction other than that of the liquid flow, sterilizing them and returning them to the other surface of the bed, substantially as described.

19. The method of purifying liquids by upward filtration through a layer of sand or other particles which consists in feeding sand to the upper surface of a filter bed and in removing from the surface of entry for liquid the layer of surface particles with the accumulations thereon, substantially as described.

20. The method of purifying liquids by filtration through a layer of solid particles, which consists in removing the layer of particles with its accumulations from that surface of the filter bed into which the impure water enters and in feeding clean sand to the other side of the filter bed at a rate so as to maintain a layer of approximately uniform thickness, substantially as described.

21. The method of filtration which consists in causing a liquid to enter downwardly and then flow upwardly through a filtering medium, and in causing such medium to move downwardly through the effluent liquid and upwardly at the surface of entry for the liquid, substantially as described.

22. The method of purifying liquid by filtration, which consists in percolating the liquid through a filtering medium and removing such medium at the side of entry for liquid at a rate faster than that at which physical impurities carried by the liquid can traverse such medium, substantially as described.

23. The method of purifying liquid by filtration, which consists in percolating the liquid through a filtering medium and supplying sterilized filtering medium at the effluent side of such medium at a rate faster than that at which germs carried by the liquid can traverse such medium, substantially as described.

24. The method of purifying liquid by filtration, which consists in percolating the liquid through a filtering medium and supplying cleaned medium at the effluent side of such medium at a rate faster than that at which physical impurities carried by the liquid can traverse such medium, substantially as described.

25. The method of purifying liquid by filtration, which consists in percolating the liquid through a germ film of its own slime and removing such slime at the side of entry of the liquid at a rate faster than that at which germs can percolate through such slime layer, substantially as described.

26. The method of purifying liquid by filtration, which consists in percolating the liquid through a film of its own slime and removing such slime at the side of entry of the liquid at a rate faster than that at which physical impurities can percolate through such slime layer, substantially as described.

27. The method of purifying liquid by filtration, which consists in percolating the liquid through a removable filtering medium, and removing such medium at the side of the entry for liquid at a rate faster than that at which impurities carried by the liquid can traverse such medium, substantially as described.

28. The method of purifying liquid by filtration, which consists in percolating the liquid through a filtering medium and removing such medium at the side of entry for liquid, and adding such medium at the opposite side, substantially as described.

29. The method of purifying liquid by filtration, which consists in percolating the liquid through a movable filtering medium and moving such medium in a direction opposite to that of the liquid flow, substantially as described.

30. The method of purifying liquid which consists in causing the liquid to flow through a clarifying medium and in causing such medium to flow through the liquid in direction opposite to the direction of flow at the latter, substantially as described.

31. The method of purifying liquids which consists in forming a film in an outflowing current of the liquid and in removing such film in a direction other than the direction of flow of the liquid, substantially as described.

32. The method of purifying liquids which consists in collecting a film between the side of entrance and the effluent side of a flowing liquid and moving such film toward such side of entrance, substantially as described.

33. The method of filtration which consists in forming a film in an outflowing current of liquid and moving such film through the liquid toward the side of entrance of the current at a rate equal to the rate of its formation, substantially as described.

34. The method of filtration, consisting of filtering a fluid through a bed of suitable material and the continuous removal, cleansing, and returning of said material without interrupting the filtering operation.

35. The method of filtration, consisting in filtering a fluid through a suitable bed and removing a layer from the bottom of the bed and after cleansing the same returning it to the top thereof without operatively disturbing the intermediate portions of the bed.

In testimony whereof, I affix my signature in presence of two witnesses.

ELMER GATES.

Witnesses:
C. W. FOWLER,
J. B. HILL.